No. 652,651. Patented June 26, 1900.
C. W., J. J. & W. P. THOMAS.
BEAN CLEANER.
(Application filed Dec. 20, 1899.)
(No Model.) 3 Sheets—Sheet 1.

WITNESSES:

INVENTORS.

ATTORNEYS.

No. 652,651. Patented June 26, 1900.
C. W., J. J. & W. P. THOMAS.
BEAN CLEANER.
(Application filed Dec. 20, 1899.)
(No Model.) 3 Sheets—Sheet 2.

WITNESSES:
J. A. Brophy
J. B. Owens

INVENTORS
C. W. Thomas, J. J. Thomas
BY W. P. Thomas
ATTORNEYS.

No. 652,651. Patented June 26, 1900.
C. W., J. J. & W. P. THOMAS.
BEAN CLEANER.
(Application filed Dec. 20, 1899.)
(No Model.) 3 Sheets—Sheet 3.

WITNESSES: INVENTORS

UNITED STATES PATENT OFFICE.

CHARLES W. THOMAS, JAMES J. THOMAS, AND WION P. THOMAS, OF SAWYER, NEW YORK.

BEAN-CLEANER.

SPECIFICATION forming part of Letters Patent No. 652,651, dated June 26, 1900.

Application filed December 20, 1899. Serial No. 741,002. (No model.)

*To all whom it may concern:*

Be it known that we, CHARLES W. THOMAS, JAMES J. THOMAS, and WION P. THOMAS, citizens of the United States, and residents of Sawyer, in the county of Orleans and State of New York, have invented a new and Improved Bean-Cleaner, of which the following is a full, clear, and exact description.

The purpose of this invention is to provide a superior means for screening and cleaning beans and the like, to which end we provide a screening-mill combined with a brush, by which latter device the beans are polished and discharged from the machine.

This specification is the disclosure of one form of our invention, while the claims define the actual scope thereof.

Reference is to be had to the accompanying drawings, forming a part of this specification, in which similar characters of reference indicate corresponding parts in all the views.

Figure 1:
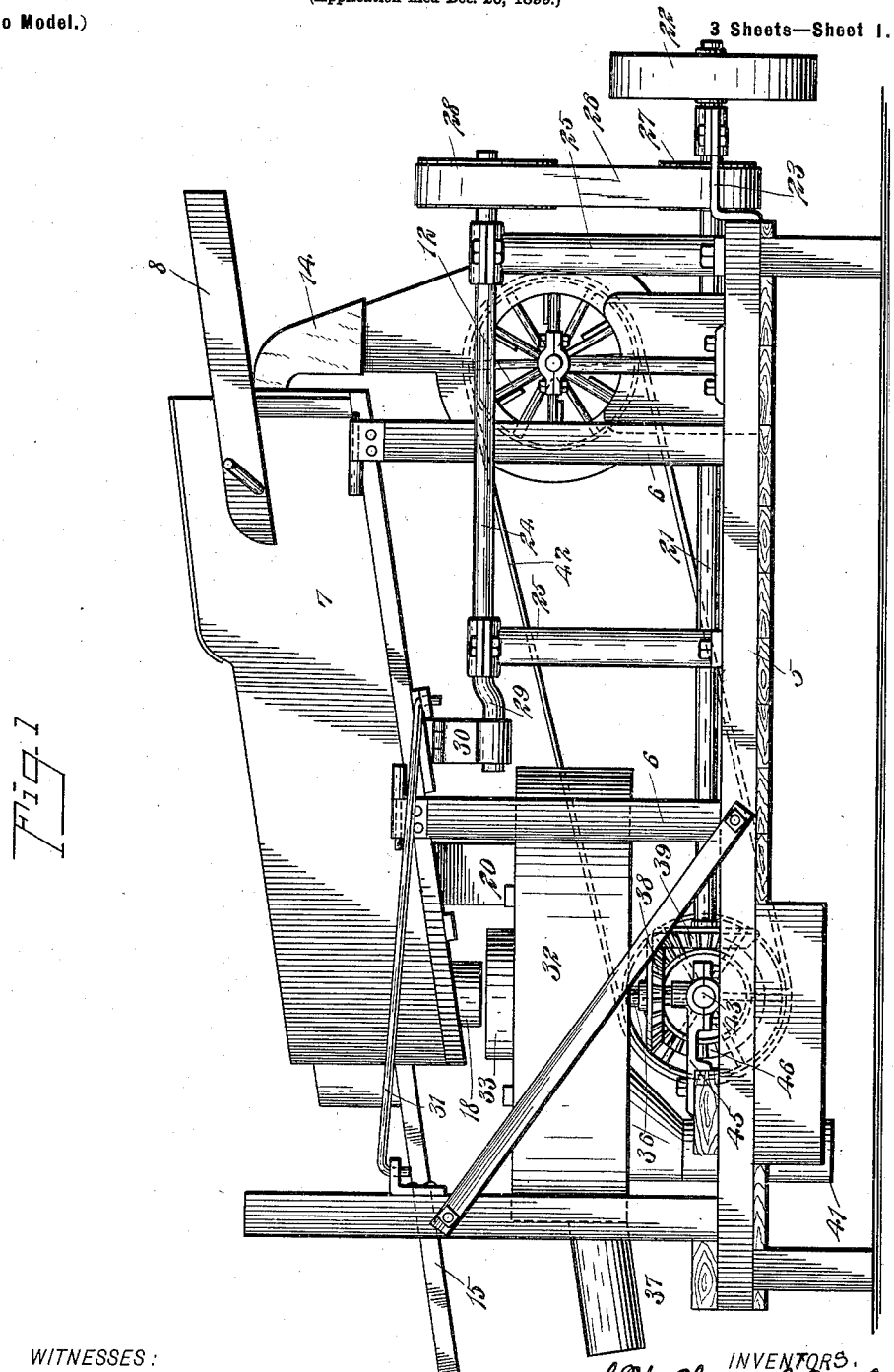
Figure 2:
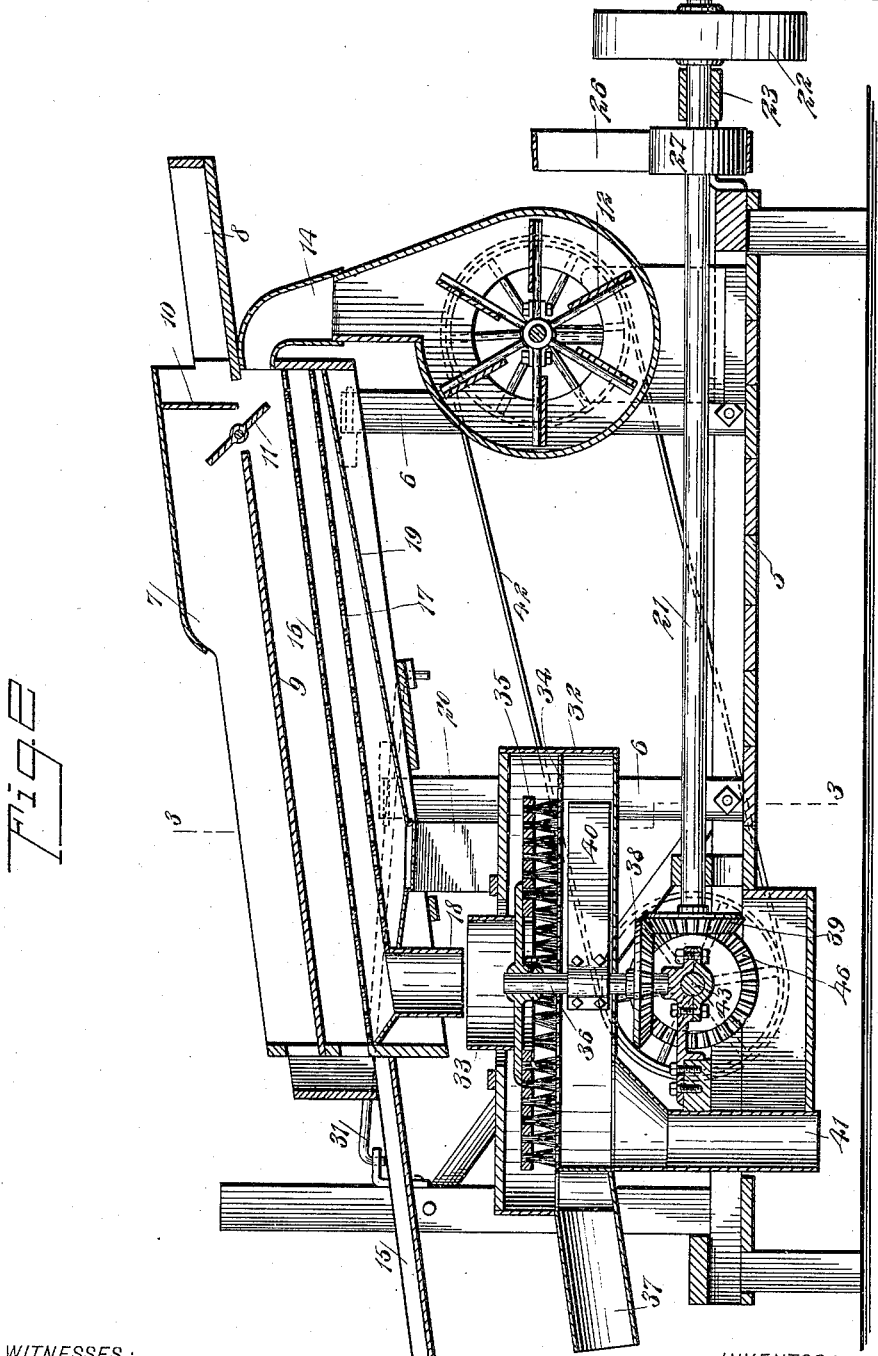
Figure 3:
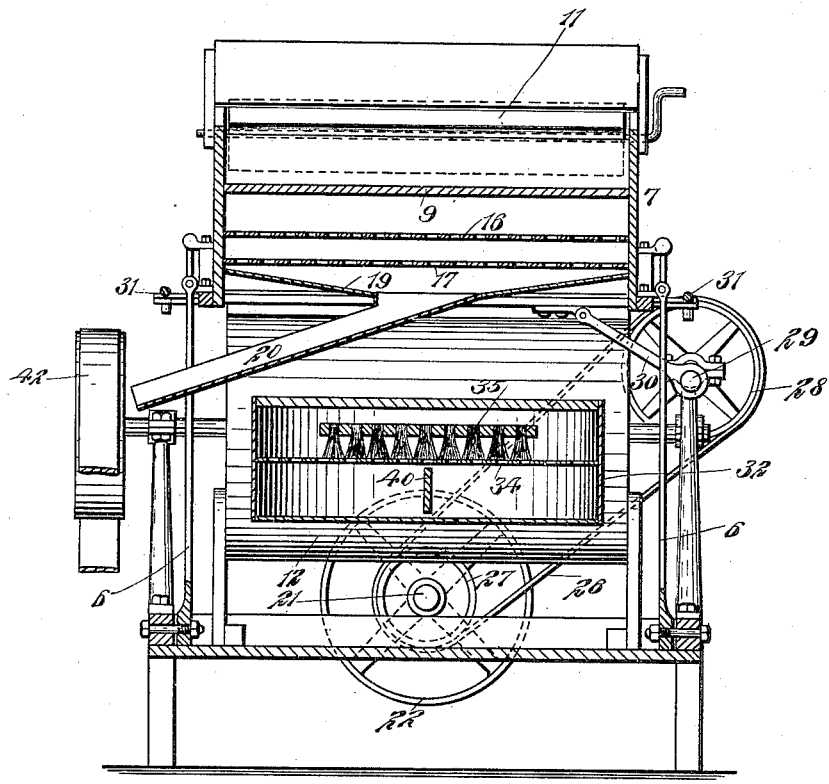
Figure 4:
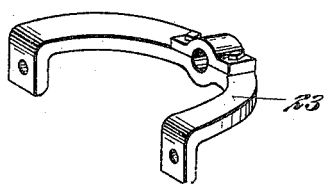

Figure 1 is a side elevation of the invention. Fig. 2 is a longitudinal section thereof. Fig. 3 is a cross-section on the line 3 3 of Fig. 2, and Fig. 4 is a detail perspective view of one of the bearings to be hereinafter described.

The machine has a framing 5, which may be of any desired sort, on each side of which are mounted two standards 6, which support the box or casing 7 of the screening-mill, the standards being made of thin wood, so that the box may be shaken or oscillated from side to side in the usual manner. On the box 7 is mounted a hopper 8, in which the beans to be cleaned and polished are placed. Within the box 7 is a blank or plate 9, inclined like the box. At the upper end of the blank 9 a vertical wall 10 is arranged, leaving a passage between the blank 9 and wall 10, the size of which may be regulated by a gate 11, mounted in the box, as shown. A blower 12 is mounted on the base or framing 5 and has its nozzle formed with a flexible portion 14, which discharges into the box 7 directly below the hopper 8, so that the beans falling from the hopper drop past the nozzle 14, and the blast from the nozzle blows the lighter impurities which are with the beans past the gate 11 and onto the blank or plate 9, down which such impurities gravitate to a discharge-spout 15, carried by the box 7.

A sieve 16 is mounted in the box below the blank 9 and parallel therewith, on which sieve the beans from the hopper 8 fall, the beans passing through the sieve, the impurities being retained by the sieve and discharged from its lower edge into the spout 15. Below the sieve 16 a second sieve 17 is arranged within the box or casing 7, and this sieve is of such mesh that the beans will not pass through it, the sieve conducting the beans to a spout 18, by means of which the beans pass from the screening device. Such impurities and other foreign matter as pass through the screen 17 are delivered upon the imperforate bottom 19 of the box or casing 7, from which they are discharged by a spout 20, passing laterally to one side of the machine.

The primary-movement shaft 21 of the machine is mounted on the base 5 and provided with a pulley 22 for driving the shaft, the pulley being attached to the outer end of the shaft, which is projected beyond the machine and held in a yoke-bearing 23, fastened to the base 5. This bearing is shown in detail in Fig. 4. A shaft 24 is mounted on pedestals 25, supported by the base, and is driven by a belt 26, which passes over a pulley 27 on the shaft 21 and a pulley 28 on the shaft 24. This shaft 24 has a crank 29, to which is attached a link 30, connected with the box or casing 7, so as to impart a shaking movement thereto. The box or casing 7 is guided and steadied in its movement by links 31, which are mounted to swing on a rigid portion of the framing, as shown, and have pivotal connection with the box or casing 7 at the respective sides thereof.

Mounted on the base 5, directly below the spout 18 of the screening device, is a circular casing 32, which is provided with an opening in its top, through which projects a large feed-pipe 33, arranged in close proximity to the spout 18, so as to receive the beans from the spout. This feed-pipe 33 leads to the interior of the casing 32 and is attached to and carried by the brush 35. Within the casing 32 is arranged a horizontally-disposed screen 34. On this screen the beans fall and are cleaned by the revoluble brush 35, fastened on a vertical shaft 36 through the medium of a set-screw, as shown, so that the brush 35 may be adjusted vertically on the shaft, causing the brush to properly engage the sieve 34. This cleans the beans, thoroughly rolling them over and over on the sieve, and finally discharges them by centrifugal action through a spout 37, from which they are taken in a cleaned state. The shaft 36 is driven continuously by means of miter-gears 38 and 39, the former being attached to the shaft 36 and the latter to the shaft 21. Within the box or casing 32 and below the sieve 34 is arranged a sweeper 40, which is fastened to the shaft 36 and turns with the same. As the beans are cleaned on the sieve 34 the foreign matter passes down beneath the sieve to the bottom of the casing 32 and is subsequently removed from the casing by the sweeper 40, which throws it into a spout 41, discharging the dirt and other impurities beneath the base 5 of the machine.

The blower 12 is driven by a belt 42, which passes from a pulley on a shaft 43, arranged horizontally in a bearing 45, mounted on the base 5, this bearing also serving as a step to the shaft 36. The shaft 43 is driven by a miter-gear 46, meshing with the gear 39, as shown.

Having thus described our invention, we claim as new and desire to secure by Letters Patent—

1. A screening device, comprising a box or casing, a blank mounted in the top thereof, a screen arranged below the blank, a spout leading from the blank and screen, a gate located at the receiving end of the blank to command the same, a second screen located below the first screen and having a spout for the discharge of the material to be screened, an imperforate bottom receiving the impurities from the second screen and provided with a spout for the discharge thereof and a fan working with the screens, substantially as described.

2. In an apparatus for cleaning beans and the like, the combination of a shaking screening device having a discharge-spout, a casing, a rotary brush mounted in the casing, and a feed-pipe attached to the brush and projecting up through the top of the casing into proximity with the spout from the screening device, the feed-pipe being of greater diameter than the spout, to insure the feeding of the material from the shaking-spout to the feed-pipe.

In testimony whereof we have signed our names to this specification in the presence of two subscribing witnesses.

CHARLES W. THOMAS.
JAMES J. THOMAS.
WION P. THOMAS.

Witnesses:
S. B. THOMAS,
H. S. BEARDSLEY.